United States Patent [19] [11] 3,906,405

Kommrusch [45] Sept. 16, 1975

[54] TUNABLE ANTENNA COUPLING CIRCUIT

[75] Inventor: Richard S. Kommrusch, Hoffman Estates, Ill.

[73] Assignee: Motorola, Inc., Chicago, Ill.

[22] Filed: July 1, 1974

[21] Appl. No.: 484,488

[52] U.S. Cl..................... 333/17 M; 333/32; 333/76

[51] Int. Cl.²........................ H03H 7/40; H03H 7/10

[58] Field of Search........... 333/17 R, 17 M, 32, 33, 333/76; 334/10; 343/745, 749, 750, 860, 343/861; 325/17, 21, 22, 25, 171, 178, 174, 325/177, 452, 462

[56] References Cited

UNITED STATES PATENTS

| | | | |
|---|---|---|---|
| 2,441,570 | 5/1948 | Glessner | 334/10 X |
| 2,855,508 | 10/1958 | Barlow et al. | 333/76 X |
| 3,087,125 | 4/1963 | Scholefield | 333/97 S UX |
| 3,160,833 | 12/1964 | Ludvigson et al. | 333/17 |
| 3,390,337 | 6/1968 | Beitman, Jr. | 333/17 UX |
| 3,778,731 | 12/1973 | Oomen | 333/17 |
| 3,794,941 | 2/1974 | Templin | 333/17 |

OTHER PUBLICATIONS

Neumann and Port – "Programmable Antenna Tuning Unit and Its Use With Shortwave Transmitter SK 1/39," in "News from Rohde and Schwarz," No. 48, Vol. 11, (1971) pp. 21–24.

*Primary Examiner*—James W. Lawrence
*Assistant Examiner*—Marvin Nussbaum
*Attorney, Agent, or Firm*—James W. Gillman; Victor Myer

[57] ABSTRACT

Tunable antenna coupling circuit for applying signals of different frequencies between an antenna and a transmitter-receiver, including a series circuit having a plurality of inductance sections and one or more shunt circuits providing capacitance between the series circuit and a reference potential. Reed switches are connected across the inductance sections, and selectively connect the capacitors in the shunt circuits, to thereby control the effective values in the circuit to match the impedance of the antenna at different frequencies to efficiently apply signals between the antenna and the transmitter-receiver. The reed switches are controlled by a channel selector having positions for the different channels (frequencies) to be used, which is coupled to the reed switches through a diode matrix for selectively operating the switches. The position of the channel selector controls the operation of predetermined ones of the reed switches to provide the desired coupling impedances for each channel. The values of inductance of the sections and the values of the capacitors have a binary relation so that by the selective connection thereof in the coupling circuit, a wide range of inductance values and capacitance values are obtained in small incremental steps.

6 Claims, 2 Drawing Figures

TUNABLE ANTENNA COUPLING CIRCUIT

BACKGROUND OF THE INVENTION

Antenna coupling circuits have been used with various arrangements for coupling signals between an antenna and a transmitter-receiver to provide coupling at different frequencies corresponding to channels to be transmitted and/or received. Some of these circuits connect in a different coupling circuit for each frequency or channel, or different portions of the circuits for the different frequencies. Such coupling circuits have been designed to operate over a limited frequency range, and to be used with an antenna of a predetermined characteristic, and are not suitable for use with antennas of different types and which have different characteristics. This is objectionable when it may be desired to use the coupling circuit with radio equipment which is suitable for operation over a wide frequency range, and to be used in many different applications, and which will be used with antennas of different types in the different applications.

It has also been proposed to use complex antenna coupling circuits having a large number of different elements, with a computer for controlling the connection of the elements to provide the desired coupling characteristics. However such systems have been extremely complex and expensive and have been suitable for use only at low power for coupling an antenna to a receiver. Such circuits cannot be used for coupling an antenna to a transmitter wherein during transmitter operation high output power, which may be of the order of 100 watts, is provided.

SUMMARY OF THE INVENTION

It is an object of the present invention to provide an improved automatic coupling circuit which is operable over a wide frequency range for coupling signals between an antenna and radio equipment.

A further object of the invention is to provide an improved antenna coupling circuit which is tunable to efficiently couple signals with antennas of different types and which have different characteristics.

Another object of the invention is to provide a tunable antenna coupling circuit having at least one bank of inductance sections and one bank of capacitors, with the values of the elements in the banks being related in a binary manner, and with the sections and capacitors being selectively coupled to provide a wide range of coupling characteristics.

Still another object of the invention is to provide an antenna coupling circuit including a plurality of inductance sections and a plurality of capacitors selectively connected into the circuit by switches, and a channel selector coupled to the switches through a matrix so that a particular set of switches is operated for each channel to provide a coupling circuit with the desired characteristics.

Yet another object of the invention is to provide a coupling circuit for connecting a radio transmitter-receiver to an antenna which selectively couples tuning elements for operation at different channels, wherein independent and noninteractive selection and tuning is provided for each channel.

A still further object of the invention is to provide an antenna coupling circuit including a plurality of reactive elements selectively connected into the circuit by reed switches which are controlled by a channel selector through a diode matrix.

In practicing the invention, an antenna coupling circuit for applying signals of different frequencies between an antenna and a transmitter-receiver includes at least one bank of inductance sections and at least one bank of capacitors connected in a modified pi network. Each bank has a plurality of components whose values are related in a binary way. The inductance sections are connected in the series circuit between the antenna and the transmitter-receiver, and the capacitors are connected in one or more shunt circuits from the series circuit to a reference potential. The inductance sections are selectively shorted by reed switches, and the capacitors are selectively connected in parallel in a shunt circuit by reed switches, to thereby control the effective values in the circuit to match the impedance of the antenna at different frequencies, to efficiently apply signals between the antenna and the transmitter-receiver. A channel selector is coupled to the reed switches through a diode matrix which provides connections for operating predetermined ones of the switches for each channel. The coupling circuit makes it possible to provide a wide range of coupling impedances in small incremental steps, so that it can be used effectively with antennas of different types under various conditions, and over a wide range of frequencies. The coupling circuit can be used at relatively high power so that it can be used for applying signals from a transmitter to an antenna, as well as from the antenna to a receiver.

DETAILED DESCRIPTION

Figure 1:
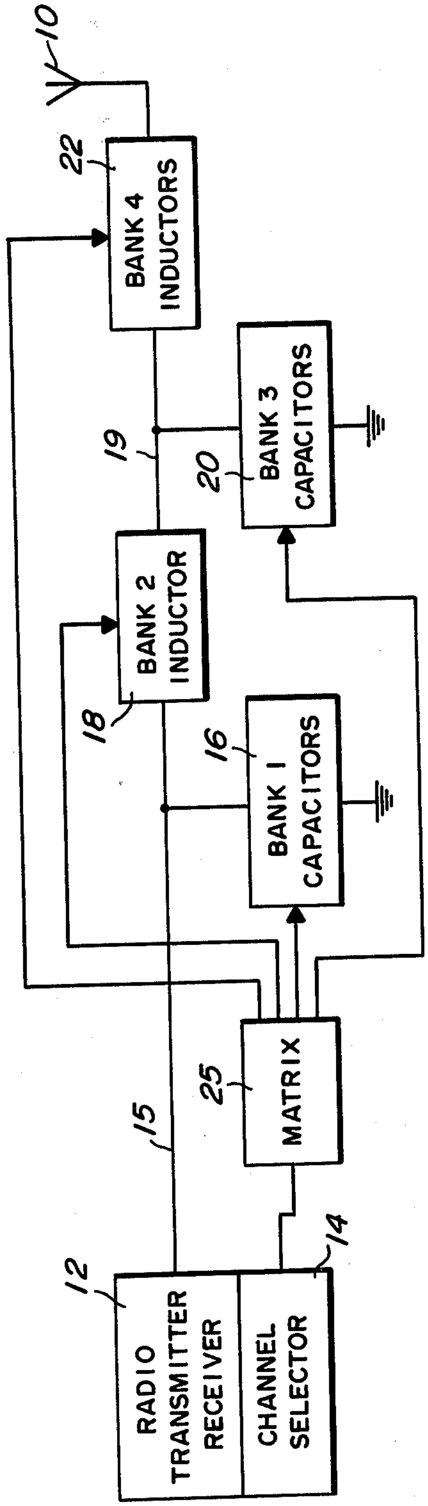
FIG. 1 is a block diagram of the antenna coupling circuit of the invention.

In FIG. 1 there is shown in block diagram form a circuit for coupling antenna 10 to radio transmitter-receiver 12. Although the coupling circuit might be used for connecting a transmitter only to an antenna, or for connecting a receiver only to an antenna, it is suitable for use with a radio transmitter-receiver wherein the transmitter power may be of the order of 100 watts. The radio transmitter-receiver includes a channel selector 14 for selecting a particular frequency or channel of operation.

An RF line 15 is connected to the radio transmitter-receiver and provides radio frequency signals to be transmitted from the radio transmitter, and applies received signals to the radio receiver of the device 12, in a well-known manner. The conductor 15 is connected to the antenna tuning circuit which includes four banks of tuning elements 16, 18, 20 and 22. Bank 1, which is designated by numeral 16, includes a plurality of capacitors selectively connected between the conductor 15 and the reference potential or ground. The conductor 15 is also connected to Bank 2, which is designated 18, and includes a plurality of inductors selectively connected in series between conductors 15 and 19. The coupling circuit may includes a third bank 20 (Bank 3) which includes capacitors selectively connected between conductor 19 and ground. A fourth bank 22 (Bank 4) which may include series inductors is connected between conductor 19 and the antenna 10.

Each of the banks 16, 18, 20 and 22 includes a plurality of elements which are selectively connected, with the banks 16 and 20 providing capacitors connected in shunt between the RF signal line 15 and ground, and banks 18 and 22 including inductors selectively connected in series in the signal line. The elements within the banks are selectively connected in accordance with the setting of the channel selector 14, through the operation of a matrix 25. Although a single line is shown from the channel selector 14 to the matrix 25, this represents a plurality of conductors, and similarly the single line from the matrix 25 to each of the banks 16, 18, 20 and 22 represent a plurality of conductors from the matrix to the various banks. The setting of the channel selector operates through connections provided by the matrix to selectively connect the capacitors and inductors in the banks, so that the tuning circuit properly matches antennas having different characteristics at different frequencies, and provides efficient coupling of signals from the antenna 10 to the radio transmitter-receiver 12.

When the antenna coupling circuit is to be used over a limited range of frequencies, and/or for tuning antennas of particular types, it may not be necessary to include Bank 3 which is the second bank 20 of capacitors. Also, it may be possible to reduce the number of inductor sections in Bank 2 and/or Bank 4 of the inductor banks 18 and 22, when the antenna coupling circuit is used in certain applications.

Figure 2:
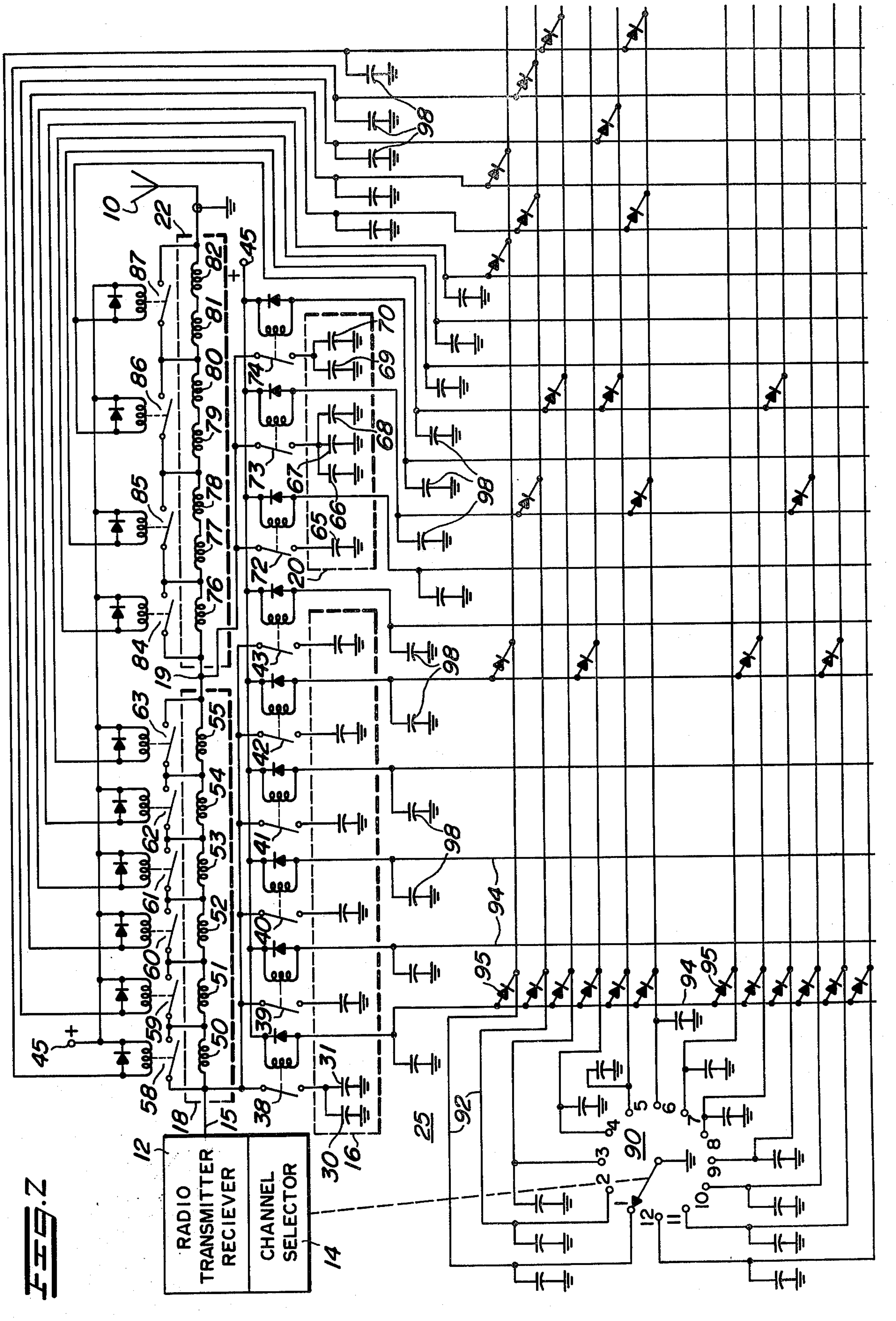
FIG. 2 is a circuit diagram of one embodiment of the tunable antenna coupling circuit of the invention.

FIG. 2 is a complete circuit diagram of one embodiment of the coupling system illustrated by the block diagram of FIG. 1. In this circuit the antenna 10 and the radio transmitter-receiver 12 are designated as in FIG. 1. Also, banks 16 and 20 of capacitors and banks 18 and 22 of inductors are designated as in FIG. 1, but show the various elements included therein. Banks 16 of capacitors includes capacitors 30, 31, 32, 33, 34, 35 and 36. Capacitors 30 and 31 are connected in parallel and can be replaced by single capacitor if a capacitor of the desired value is available. The capacitors 30 and 31 are selectively connected to conductor 15 by the contacts of reed switch 38. Similarly the capacitors 32, 33, 34, 35 and 36 are selectively connected to the RF line 15 in parallel with the capacitors 30 and 31, by operation of the reed switches 39 to 43 respectively. The windings of each of the reed switches is bridged by a diode to damp the oscillation which might develop therein when the energizing current is terminated. One terminal of each of the switch windings is connected to the positive supply potential terminal 45 and the other terminal is selectively grounded by an output conductor 94 of the matrix 25, as will be described in detail.

The bank of inductors 18 includes inductor sections 50 to 55 which are connected in series in the RF line 15. Each of these sections is bridged by the contacts of a reed switch, with the sections 50 to 55 being selectively bridged by the contacts of reed switches 58 to 63, respectively. Each of the switch windings is bridged by a diode and is connected between the positive potential 45 and an output conductor 94 of the matrix 25.

The bank 20 of capacitors includes capacitors 65 to 70, inclusive. Capacitor 65 is selectively connected to conductor 19 by the contacts of reed switch 72, the winding of which is connected between the positive potential 45 and an output conductor 94 leading from the matrix 25. Capacitors 66, 67 and 68 are connected in parallel and are selectively connected to conductor 19 by the contacts of reed switch 73. Capacitors 69 and 70 are connected in parallel and are selectively connected to the conductor 19 by the contacts or reed switch 74. The windings of reed switches 72, 73 and 74 are bridged by diodes, as previously described, and are connected between the plus potential 45 and output conductors 94 extending from the matrix 25.

The bank 22 of inductors is connected between the RF conductor 19 and the antenna 10 and includes inductor sections 76 to 82, inclusive. Inductor section 71 is selectively bridged or shorted by the contacts of reed switch 84, the winding of which is connected between the positive potential 45 and one output conductor 94 of the matrix 25. Winding sections 77 and 78 are connected in series, with the series combination being selectively bridged by the contacts of reed switch 85. Again the winding of reed switch 85 is connected between the positive potential 45 and an output conductor 94 from the matrix 25. Inductor sections 79 and 80 are connected in series and are selectively bridged by the contacts of reed switch 86, and inductor sections 81 and 82 are connected in series and are selectively bridged by the contact or reed switch 87. The windings of reed switches 86 and 87 are connected in parallel with each other and are connected between the positive potential 45 and an output conductor 94 of the matrix 25.

The matrix 25 is a diode matrix of known construction which includes twelve input lines 92, shown as horizontal lines in FIG. 2, and eighteen output lines 94, shown as vertical lines. Each input line 92 is adapted to be connected to one or more output lines 94 by diodes 95. The input lines 92 are connected to the twelve fixed contacts of selector switch 90, which is part of the channel selector 14 of the radio. The switch 90 includes a movable contact which is grounded. Accordingly, the selector switch 90 in each of the twleve positions connects one of the input leads 92 to ground. Each of the input lines 92 is bypassed by a capacitor 96 connected to ground, so that the input lines which are not grounded by the selector switch 90 are grounded with respect to radio frequency (RF) signals. Also, each of the output lines 94 is bypassed by a capacitor 98. These lines or conductors 94 are selectively grounded by the diodes 95 connecting the matrix input lines 92 which extend from the selector switch 90 to the output lines 94.

By the selective connection of the diodes 95 between the input lines 92 and the output lines 94, each of the twelve positions of the selector switch can be utilized to provide a ground to a particular group of the reed switches. The winding of each reed switch is connected to a different one of the output lines 94, except for reed switches 86 and 87 the windings of which are connected in parallel to the same output line 94. Any number of the output lines 94 can be grounded by each input line by connection of the diodes 95, and the same output line can be grounded in a plurality of selector switch positions by diodes 95 connecting the input lines 92 from such switch positions to such output line. The tuning for each channel is independent of, and noninteractive with, the tuning for the other channels.

The capacitors in bank 16 have values such that the selective operation of the reed switches connects a capacitor having a progressively smaller value of capacitance to conductor 15, with the ratio being slightly less than 2:1. For example, the capacitors can have the following values:

| | |
|---|---|
| Capacitors 30 and 31 in parallel | 2280 pf |
| Capacitor 32 | 1200 pf |
| Capacitor 33 | 630 pf |
| Capacitor 34 | 330 pf |
| Capacitor 35 | 180 pf |
| Capacitor 36 | 100 pf |

The inductor sections of bank 18 have progressively increasing inductance values having values related in the ratio of 1:2. For example the inductor sections can have the following values:

| | |
|---|---|
| Inductor 50 | .2 uh |
| Inductor 51 | .4 uh |
| Inductor 52 | .8 uh |
| Inductor 53 | 1.6 uh |
| Inductor 54 | 3.2 uh |
| Inductor 55 | 6.4 uh |

The capacitors of bank 20 similarly have decreasing values as follows:

| | |
|---|---|
| Capacitor 65 | 260 pf |
| Capacitors 66, 67 and 68 in parallel | 130 pf |
| Capacitors 69 and 70 in parallel | 70 pf |

The inductors of bank 22 have gradually increasing values, which continue from the values of the inductors in bank 18 related in the ratio of 1:2. The values may be as follows:

| | |
|---|---|
| Inductor 76 | 12.8 uh |
| Inductors 77 and 78 in series | 25.6 uh |
| Inductors 79, 80, 81 and 82 in series | 51.2 uh |

It is therefore seen that a very simple tuning operation is provided whereby the selector switch selects one of the matrix input conductors to operate the reed switches to connect inductors and capacitors having values related in a binary sequence. By operating the reed switches so that a plurality of inductors are effectively connected in series, the total inductance value can be selected in steps of 0.2 microhenries. Similarly, the capacitors in each bank can be selectively connected in parallel by operation of the reed switches, so that the total capacitance in each bank can have a wide range of values which can be selected in very small increments.

The antenna coupling circuit as illustrated in FIG. 2, with component values specified above, has been found to be suitable for use with a marine single sideband radio operative over the range from 2 to 18 MHz. This has provided the tuning required for proper matching of vertical marine antennas having lengths from 12 to 34 feet. The coupling circuit is also suitable for use with antennas of other types which might be used at base stations. Proper matching has been obtained when using various types of grounds including salt water and fresh water. the coupling circuits has been used at transmitter powers up to 100 watts.

The matrix can be set up by the use of switches to individually ground the windings of the reed switches, to selectively operate the switches to determine which components in the four banks should be connected for operation for properly tuning the circuit for each channel to be used. After the particular components are determined, diodes are placed at the junctions of the matrix to provide the required ground connections. As a practical matter, it may be desirable to provide diodes at all junctions when the matrix is constructed, and to cut a lead of each diode which is not to be used when the required components have been selected.

The use of reed switches with sealed contacts has been found to provide highly reliable operation, and such switches have been found to have long life. The reed switches are the only parts of the tuner circuit which involve mechanical parts, and the maintenance of the coupling circuit is minimal.

What is claimed is:

1. A tunable coupling circuit for applying signals of different frequencies between a first signal translating device and a second signal translating device for matching the impedance of the translating devices and efficiently coupling signals therebetween, such coupling circuit including in combination, a series circuit connected between the first and second translating devices and including a plurality of inductance coil sections connected in series, a shunt circuit connected between said series circuit and a reference potential and including a plurality of capacitors, switch means including a first plurality of switches having contacts individually connected across said coil sections for selectively shunting said coil sections in said series circuit and a second plurality of switches having contacts individually connected to said capacitors for selectively connecting said capacitors in parallel in said shunt circuit, a certain one or more of said first plurality of switches and a certain one or more of said second plurality of switches when actuated effect tuning of said coupling circuit to a particular one of said different frequencies, matrix means having input lines and output lines, each one of said input lines having one-way connections with one or more of said output lines, which connections for each input line being associated with a particular one of said different frequencies, one each of said output lines being connected to a respective one each of said first plurality and said second plurality of switches, and selector means for tuning the coupling circuit to one of said different frequencies, said selector means including a plurality of conductors, each one of said conductors being associated with a particular one of said different frequencies, the conductor of said selector means associated with a particular one of said different frequencies being connected to the input conductor of said matrix means for that same frequency, and means for selectively connecting one of said plurality of conductors to a given potential for defining a circuit through said selector and the circuit of said matrix to those switches of said first plurality of switches and said second plurality of switches associated with the particular frequency.

2. A tunable coupling circuit in accordance with claim 1 wherein said selector means includes a channel selector switch.

3. A tunable coupling circuit in accordance with claim 1 wherein the one-way connections of said matrix means comprises diodes.

4. A tunable coupling circuit for connecting an antenna to a radio transmitter-receiver for matching the impedance of the antenna and efficiently applying signals of different frequencies from the transmitter to the antenna and from the antenna to the radio receiver, such coupling circuit including in combination, a series circuit connected between the antenna and the radio and including a plurality of inductors connected in series, a shunt circuit connected between said series circuit and a reference potential and including a plurality of capacitors, switch means including a first plurality of switches having contacts individually connected across said inductors for selectively shunting the same and a second plurality of switches having contacts individually connected in series with said capacitors for selectively connecting the same in parallel in said shunt circuit, a certain one or more of said first plurality of switches and a certain one or more of said second plurality of switches when actuated effect tuning of said coupling circuit to a particular one of said different frequencies, matrix means having a plurality of input lines and a plurality of output lines, each one of said input lines having one-way connections with one or more of said output lines, which connections for each input line being associated with a particular one of said different frequencies, one each of said output lines being connected to a respective one each of said first plurality and said second plurality of switches, and, selector means for tuning the coupling circuit to one of said different frequencies, said selector means including a plurality of conductors, each one of said conductors being associated with a particular one of said different frequencies, the conductor of said selector means associated with a particular one of said different frequencies being connected to the input conductor of said matrix means for that same frequency, and means for selectively connecting one of said plurality of conductors to a given potential for defining a circuit through said selector and the circuit of said matrix to those switches of said first plurality of switches and said second plurality of switches associated with the particular frequency.

5. A tunable coupling circuit in accordance with claim 4 wherein said switches are reed switches having contacts and windings for operating said contacts, with said windings being individually connected to said output lines of said matrix means.

6. A tunable coupling circuit in accordance with claim 4 wherein said shunt circuit is connected to said series circuit adjacent to the antenna, and including a further shunt circuit connected to said series circuit at a point between a pair of said inductors thereof, said further shunt circuit including a further plurality of capacitors and further switches having contacts individually connecting said capacitors in parallel in said further shunt circuit, and wherein said matrix means includes further output lines connected to said further switches for selectively operating the same.

* * * * *